Dec. 7, 1926.  
D. S. TAYLOR  
CLUTCH THROW-OUT FORK  
Filed Jan. 9, 1926

1,609,741

Inventor  
DONALD S. TAYLOR

By Blackmore, Spencer & Flint  
Attorneys

Patented Dec. 7, 1926.

1,609,741

UNITED STATES PATENT OFFICE.

DONALD S. TAYLOR, OF DETROIT, MICHIGAN, ASSIGNOR TO GENERAL MOTORS CORPORATION, OF DETROIT, MICHIGAN, A CORPORATION OF DELAWARE.

CLUTCH THROW-OUT FORK.

Application filed January 9, 1926. Serial No. 80,225.

This invention relates to a clutch throwout fork more particularly intended for use on motor vehicles.

It is an object of the invention to provide a clutch throwout lever with means for attaching a clutch operating ring thereto, which shall be simple, cheap to manufacture and easy of manipulation.

With this general object in view the invention is embodied in the arrangement and combination of parts herein described and particularly defined in the appended claims.

Figure 1:
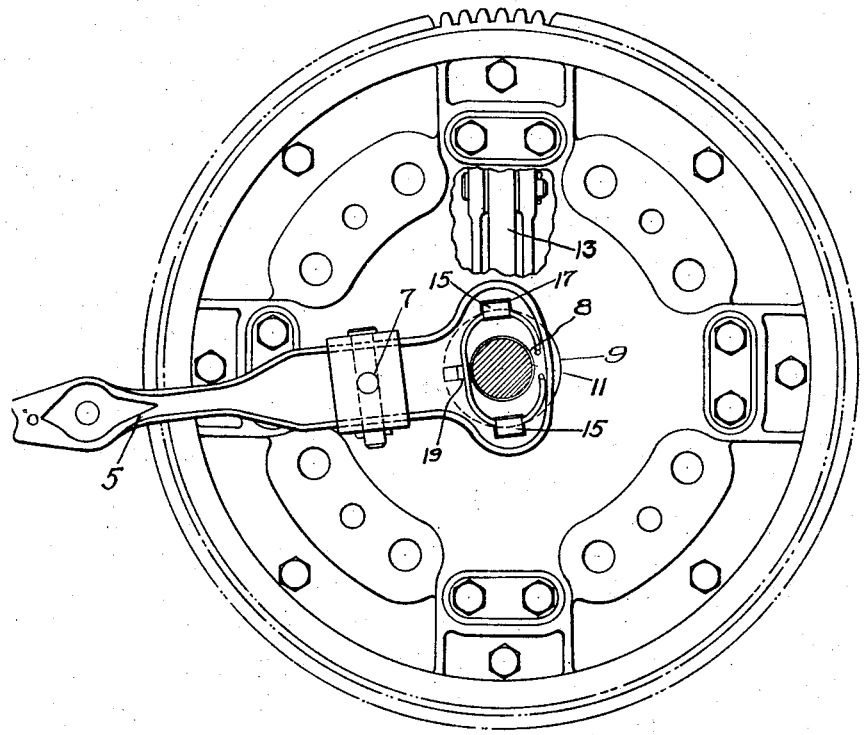

In the drawing, Figure 1, is a rear elevation of the clutch mechanism showing the lever in position, and a preferred form of its attachment to the ring.

Figure 2:
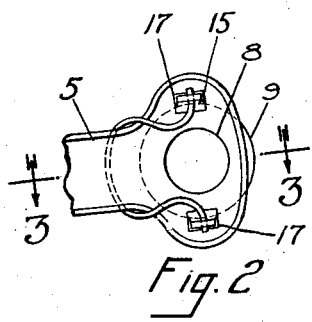
Figure 3:
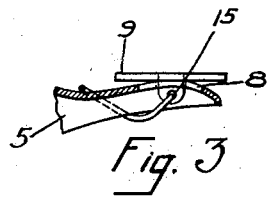

Figure 2 shows a detail of a similar view illustrating a modified form and Figure 3 is a section on line 3—3, of Figure 2.

Referring to the drawings, numeral 5 designates a lever, preferably made in the form of a channel shaped stamping, used to release the clutch of a motor vehicle. At 7 is shown means whereby a lever may be pivoted to a fixed member. The lever is to be operated by any suitable connection applied to its outer end. The inner end of the lever is enlarged and apertured as at 8 and is to be connected to the ring 9, slidable on the driven shaft 11. This ring, it may be stated, operates through the agency of mechanism including levers 13, shown on Figure 1, and releases the clutch plate against the tension of the usual springs. These internal details are no part of the invention, and are not shown on the drawing.

The purpose of the invention is to provide convenient means to connect the lever and the sliding ring. To that end the ring is provided with lugs 15, diametrically disposed and passing through openings 17 in the enlarged end of the lever. These lugs are bent over and engaged under these bent-over ends is a piece of spring steel wire bent into the form of an elongated loop. The mid-portion of the unbroken long side of the loop may be engaged against a lug 19, carried by the lever.

In a modified form as shown in Figures 2 and 3, the lugs projecting from the sliding collar and passing through openings in the lever end, are transversely apertured. The wire is placed at its middle portion on the forward side of the lever and its ends are bent around to the rear side of the lever, where they are projected through the openings in the lugs of the ring.

Owing to its resilience, the wire in each of these two forms in easily placed in locking position, and the parts are securely held.

What I claim and desire to protect by Letters Patent is:

1. A throwout lever for a clutch having an operating member adjacent its power end, means to secure the member to the lever, consisting of an enlarged end on the lever having diametrically opposite openings, the member having bent-over lugs entering the openings, a resilient wire lying against the face of the lever remote from the member and engaged under the bent over ends of the lugs.

2. A clutch throwout lever having openings at its power end, an operating ring adjacent the power end of the lever, having bent-over lugs passing through said lever openings, a lug on the lever, a spring wire member to lock the lever to the ring, engaging the face of the lever remote from the ring, also engaging against the lever lug and passing under the bent-over ends of the ring lugs.

In testimony whereof I affix my signature.

DONALD S. TAYLOR.